US009588729B2

(12) United States Patent
Liu et al.

(10) Patent No.: US 9,588,729 B2
(45) Date of Patent: Mar. 7, 2017

(54) PROJECTOR, IMAGE OUTPUT APPARATUS, AND CONTROL METHOD THEREOF

(71) Applicant: Acer Incorporated, New Taipei (TW)

(72) Inventors: Chi-Hsiang Liu, New Taipei (TW); Yung-Sen Lin, New Taipei (TW); Chang-Ping Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 208 days.

(21) Appl. No.: 14/460,379

(22) Filed: Aug. 15, 2014

(65) Prior Publication Data
US 2015/0109198 A1    Apr. 23, 2015

(30) Foreign Application Priority Data
Oct. 21, 2013   (TW) .............................. 102137940 A

(51) Int. Cl.
*H04B 7/00*   (2006.01)
*G06F 3/14*   (2006.01)
*G06F 21/84*   (2013.01)
*G09G 5/00*   (2006.01)

(52) U.S. Cl.
CPC ............ *G06F 3/1454* (2013.01); *G06F 21/84* (2013.01); *G09G 5/003* (2013.01); *G09G 2358/00* (2013.01); *G09G 2370/16* (2013.01)

(58) Field of Classification Search
CPC ...... G09G 5/12; G09G 5/003; G09G 2370/16; G09G 2354/00; G09G 2358/00; G06F 3/1454; G06F 21/84; H04W 76/023
See application file for complete search history.

(56) References Cited

U.S. PATENT DOCUMENTS

| | | | |
|---|---|---|---|
| 2007/0026800 A1* | 2/2007 | Hsu ........................ | H04L 69/18 455/41.2 |
| 2011/0090405 A1* | 4/2011 | Hiroki ..................... | G03B 21/14 348/705 |
| 2011/0221763 A1* | 9/2011 | Arizumi ................ | G06F 3/1454 345/619 |
| 2013/0176494 A1* | 7/2013 | Takemoto ............. | H04N 5/268 348/563 |
| 2014/0104138 A1* | 4/2014 | Brown ................... | G06F 3/1423 345/1.1 |
| 2014/0365567 A1* | 12/2014 | Krishnakumar ...... | H04L 67/104 709/204 |
| 2015/0199166 A1* | 7/2015 | Eguchi .................. | G06F 3/1454 345/2.2 |

FOREIGN PATENT DOCUMENTS

TW   200906182   2/2009

\* cited by examiner

*Primary Examiner* — Amare Mengistu
*Assistant Examiner* — Jennifer Zubajlo
(74) *Attorney, Agent, or Firm* — Jianq Chyun IP Office

(57) ABSTRACT

A projector, an image output apparatus, and a control method thereof are provided. In the method, a search signal transmitted by a controller is received, and accordingly at least one user apparatus supporting a wireless protocol is searched from surroundings by using the wireless protocol and a wireless connection is established with each user apparatus. Then, a control signal transmitted by the controller is received, and accordingly one of the at least one user apparatus is selected. An image provided by the selected user apparatus is received through the wireless connection and projected.

17 Claims, 6 Drawing Sheets

PROJECTOR, IMAGE OUTPUT APPARATUS, AND CONTROL METHOD THEREOF

CROSS-REFERENCE TO RELATED APPLICATION

This application claims the priority benefit of Taiwan application serial no. 102137940, filed on Oct. 21, 2013. The entirety of the above-mentioned patent application is hereby incorporated by reference herein and made a part of this specification.

BACKGROUND OF THE INVENTION

Field of the Invention

The invention relates to a projector and a control method thereof, and more particularly, to a projector supporting Miracast and a control method thereof.

Description of Related Art

Operating a projector in a meeting is a common experience for people nowadays. Before the meeting begins, a presenter needs to store an electronic file of a presentation into a computer, and connect the computer to the projector in a conference room. During the presentation, it is required for the presenter to operate the computer to switch between projected images, or utilize a presentation controller having a connection established in advance with the computer in order to remotely control the computer to switch between the images projected by the projector.

Nowadays, as benefited from rapid developments of wireless technology, wireless communication technology including Bluetooth, WiFi Direct may be used by the projector to connect with the computer, or even connect with portable electronic devices such as a cell phone and a tablet computer. Images may be directly transmitted to the projector in a wireless manner so as to be projected by the projector. A Miracast technology is a wireless display standard constructed based on WiFi Direct technology. The Miracast technology allows an electronic device to directly play videos or pictures on the projector without any cables or going though an access point (AP).

However, the Miracast technology only supports an one-to-one connection. In other words, while a device is playing the images on the projector by using the Miracast technology, that projector cannot be used by other devices. In this case, the other devices can be connected to the projector for playing the images by using the Miracast technology only when the currently connected device disconnects the connection by using a software installed therein. Nevertheless, such operating method is complex and inconvenient for users.

SUMMARY OF THE INVENTION

The invention is directed to a projector, a control method of projector and an image output apparatus, capable of controlling the projector to connect with a plurality of user apparatuses, selecting one of the user apparatuses, receiving and projecting an image provided by the selected user apparatus.

The control method of projector of the invention is adapted a projector to receive a control signal and accordingly project an image. In the method, a search signal transmitted by a controller is received, and accordingly at least one user apparatus supporting a wireless protocol is searched from surroundings by using the wireless protocol and a wireless connection is established with each of the at least one user apparatus. Then, a control signal is received from the controller, and accordingly one of the at least one user apparatus is selected. An image is received from the selected user apparatus through the wireless connection and is projected thereafter.

In an embodiment of the invention, after the step of establishing the wireless connection with each of the at least one user apparatus, the control method further establishes a device list containing the user apparatuses having the wireless connection established according to a connection sequence or a priority sequence of the user apparatuses having the wireless connection established.

In an embodiment of the invention, after the step of establishing the device list containing the user apparatuses having the wireless connection established according to the connection sequence or the priority sequence of the user apparatuses having the wireless connection established, the control method further displays the device list in the projected image when the control signal transmitted by the controller is received.

In an embodiment of the invention, the steps of receiving the control signal transmitted by the controller, selecting the one of the user apparatuses according to the control signal, receiving the image provided by the selected user apparatus through the wireless connection and projecting the image include selecting one of the user apparatuses in the device list, receiving the image provided by the selected user apparatus through the wireless connection according to the control signal and projecting the image.

In an embodiment of the invention, the steps of receiving the control signal transmitted by the controller, selecting one of the user apparatuses according to the control signal, receiving the image provided by the selected user apparatus through the wireless connection and projecting the image further include interrupting the wireless connection established with the user apparatus currently providing the projected image.

In an embodiment of the invention, after the step of interrupting the wireless connection established with the user apparatus currently providing the projected image, the control method further selects a next user apparatus of the user apparatus having the wireless connection interrupted according to the connection sequence or the priority sequence of the user apparatuses in the device list, receiving the image provided by the next user apparatus through the wireless connection and projecting the image.

In an embodiment of the invention, the steps of receiving the control signal transmitted by the controller, selecting the one of the user apparatuses according to the control signal, receiving the image provided by the selected user apparatus through the wireless connection and projecting the image include switching from the user apparatus currently providing the projected image to a next user apparatus according to the connection sequence or the priority sequence of the user apparatuses in the device list, receiving the image provided by the next user apparatus through the wireless connection and projecting the image.

In an embodiment of the invention, after the step of establishing the device list containing the user apparatuses having the wireless connection established according to the connection sequence or the priority sequence of the user apparatuses having the wireless connection established, the control method further transmits the device list to the controller, and displays the device list on the controller.

In an embodiment of the invention, the controller is one of the user apparatuses, and the controller establishes the wireless connection with the projector by using the wireless protocol and transmits the search signal and the control signal through the wireless connection.

In an embodiment of the invention, the projector establishes the wireless connection with the user apparatus by using a WiFi Direct technology, receives and then projects the image provided by each the user apparatus by using a Miracast technology.

The projector of the invention includes a wireless connecting apparatus, a projecting apparatus, a receiving apparatus and a processing apparatus. The wireless connecting apparatus searches at least one user apparatus supporting a wireless protocol from surroundings by using the wireless protocol, and establishes a wireless connection with each of the user apparatuses. The projecting apparatus is configured to project an image provided by one of the user apparatuses, and the receiving apparatus is configured to receive a control signal transmitted by a controller. The processing apparatus is coupled to the wireless connecting apparatus, the projecting apparatus and the receiving apparatus, and configured to select one of the user apparatuses connected to the wireless connecting apparatus, receive the image provided by the user apparatus through the wireless connection, and control the projecting apparatus to project the image according to the control signal received by the receiving apparatus.

In an embodiment of the invention, the processing apparatus further establishes a device list containing the user apparatuses having the wireless connection established according to a connection sequence or a priority sequence of the user apparatuses having the wireless connection established.

In an embodiment of the invention, the processing apparatus further displays the device list in the projected image when the control signal is received by the receiving apparatus.

In an embodiment of the invention, the processing apparatus selects one of the user apparatuses in the device list, receives the image provided by the selected user apparatus through the wireless connection, and controls the projecting apparatus to project the image according to the control signal received by receiving apparatus.

In an embodiment of the invention, the processing apparatus interrupts the wireless connection established by the wireless connecting apparatus with the user apparatus currently projecting the image according to the control signal received by the receiving apparatus.

In an embodiment of the invention, the processing apparatus further selects a next user apparatus of the user apparatus having the wireless connection interrupted according to the connecting sequence or the priority sequence of the user apparatuses in the device list, receives the image provided by the next user apparatus through the wireless connection, and controls the projecting apparatus to project the image.

In an embodiment of the invention, the processing apparatus switches the user apparatus currently providing the projected image to a next user apparatus according to the connecting sequence or the priority sequence of the user apparatuses in the device list, receives the image provided by the next user apparatus through the wireless connection, and controls the projecting apparatus to project the image.

In an embodiment of the invention, the controller is one of the user apparatuses, and the controller establishes the wireless connection with the wireless connecting apparatus of the projector by using the wireless protocol and transmits the control signal through the wireless connection.

In an embodiment of the invention, the processing apparatus displays the device list on the controller by transmitting the device list to the controller through the wireless connection.

The image output apparatus of the invention includes a wireless connecting apparatus, an output apparatus, a receiving apparatus and a processing apparatus. The wireless connecting apparatus searches at least one user apparatus supporting a wireless protocol from surroundings by using the wireless protocol, and establishes a wireless connection with each of the user apparatuses. The output apparatus is configured to connect to a projector, and output an image provided by one of the user apparatuses to the projector for projecting the image by the projector. The receiving apparatus is configured to receive a control signal transmitted by a controller. The processing apparatus is coupled to the wireless connecting apparatus, the output apparatus and the receiving apparatus, and configured to select one of the user apparatuses connected to the wireless connecting apparatus, receive the image provided by the selected user apparatus through the wireless connection, and output the image to the projector through the output apparatus for projecting the image by the projector according to the control signal received by the receiving apparatus.

Based on above, in the projector, the image output apparatus and the control method thereof of the present invention, the projector searches the user apparatuses in advance, establishes connections with the user apparatuses, and provides a controller for the user to control the projector to perform operations such as connecting, interrupting, switching on the user apparatuses, so that the application of the Miracast technology may be easier and more effective.

To make the above features and advantages of the disclosure more comprehensible, several embodiments accompanied with drawings are described in detail as follows.

DESCRIPTION OF THE EMBODIMENTS

The invention changes an architecture of a projector according to a principle that the Miracast technology is based on a WiFi Direct technology. This allows the projector to establish connections with a plurality of user apparatuses, so that users may utilize a remote control for controlling the projector to switch to the user apparatus currently using the Miracast technology or directly disconnect the user apparatus currently projecting images. Accordingly, other user apparatuses may gain access to the projector for projecting images by the projector.

Figure 1:
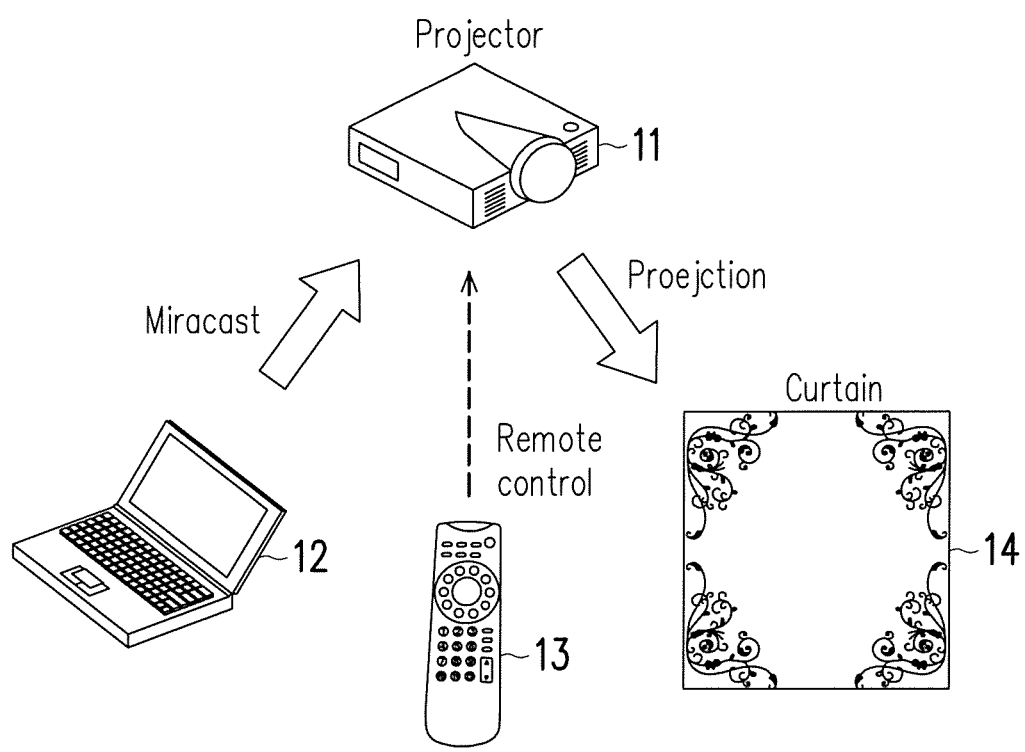
FIG. 1 is a schematic diagram illustrating a control method of a projector according to an embodiment of the invention.

FIG. 1 is a schematic diagram illustrating a control method of projector according to an embodiment of the invention. Referring to FIG. 1, in the present embodiment, it simulates a situation that a user connects a notebook computer 12 to a projector 11 and controls the projector 11 to project images onto a curtain 14 by utilizing the Miracast technology. The user may remotely control the projector 11 through a remote control 13, and by utilizing a connection between the projector 11 and the notebook computer 12, the notebook computer 12 may disconnect the connection currently using the Miracast technology. Accordingly, other devices may be connected to the projector 11 for projecting images.

On the other hand, multiple user apparatuses may also establish connections with the projector of the invention at the same time by utilizing the Wi-Fi direct technology located at lower layer, and the user may perform a quick switch by using the remote control when images are to be shared or projected by different users.

Figure 2:
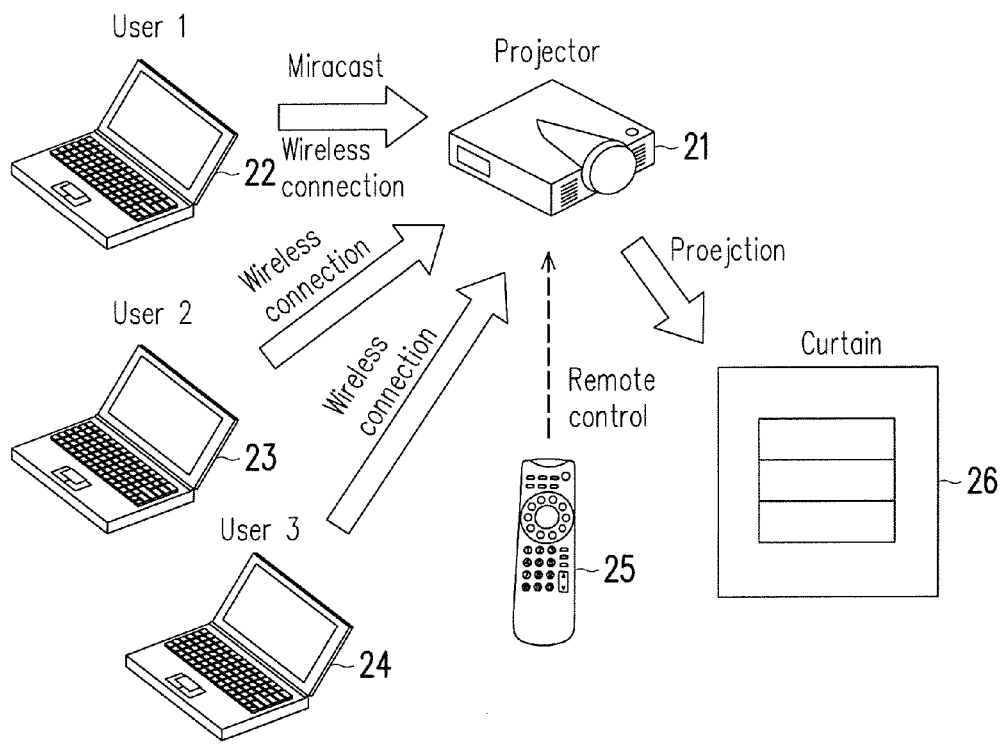
FIG. 2 is a schematic diagram illustrating a control method of a projector according to an embodiment of the invention.
Figure 3:
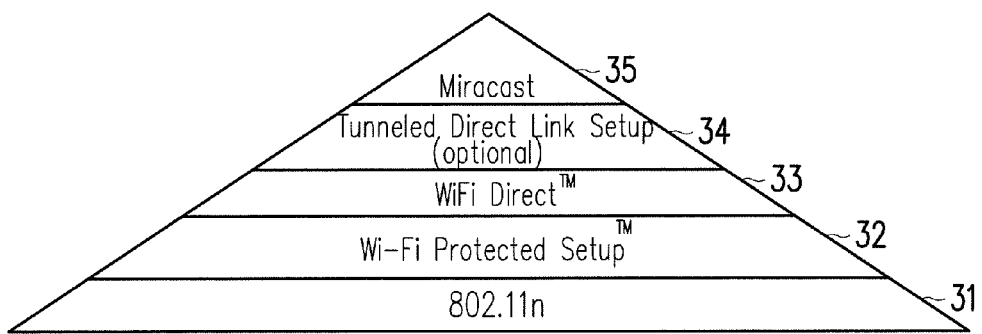
FIG. 3 is a structural diagram illustrating a Miracast technology according to an embodiment of the invention.

More specifically, FIG. 2 is a schematic diagram illustrating a control method of a projector according to an embodiment of the invention. FIG. 3 is a structural diagram illustrating a Miracast technology according to an embodiment of the invention. Referring to FIG. 2, in the present embodiment, each of user apparatuses 22, 23 and 24 may establish a wireless connection with a projector 21 through the Wi-Fi direct technology, and one of the user apparatuses (i.e., the user apparatus 22) may control the projector 21 to project images on a curtain 26 through the Miracast technology. In view of FIG. 3, an architecture of the Miracast technology includes 802.11n 31, Wi-Fi Protected Setup™ 32, Wi-Fi Direct™ 33, Tunneled Direct Link Setup (TDLS) 34 and Miracast 35 from bottom to top in that sequence. Therein, the Miracast 35 is above the Wi-Fi Direct 33, thus a connection with the Wi-Fi Direct 33 must be established first before using the Miracast 35 for playing images. Despite that the Miracast 35 only permits an one-to-one connection, the Wi-Fi Direct 33 may permit connections from multiple user apparatuses at same time. Accordingly, in the present embodiment, the wireless connections established in advance between the projector 21 and the user apparatuses 22, 23 and 24 may be utilized by the user, so as to operate a remote control 25 to control the projector 21 to display the user apparatuses (i.e., users 1 to 3) currently connected in the projected image, so that the user may select the user apparatus for using the Miracast technology or switching among different user apparatuses, accordingly. Therein, since the wireless connections of the user apparatuses 22, 23 and 24 with the projector 21 are already established, when the user uses the remote control 25 for switching, the user apparatus may skip steps of establishing the connection, so as to quickly control the projector 21 for projecting images by using the Miracast technology.

Figure 4:
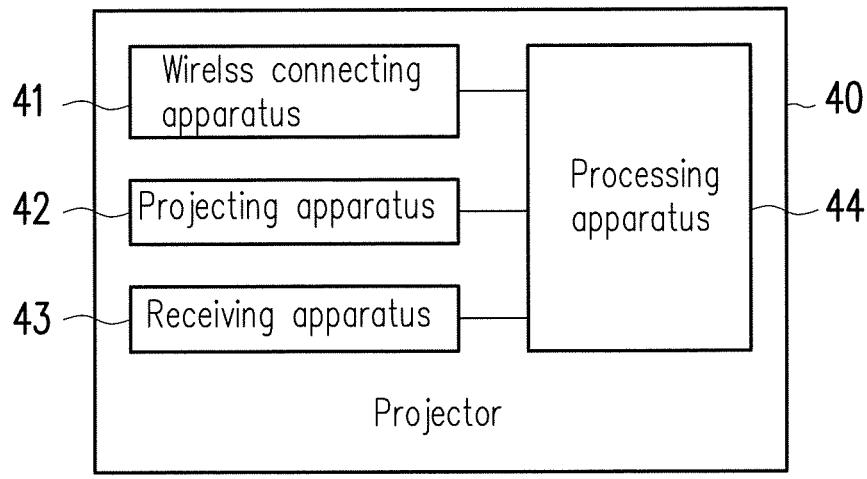
FIG. 4 is a block diagram illustrating a projector according to an embodiment of the invention.

FIG. 4 is a block diagram illustrating a projector according to an embodiment of the invention. Referring to FIG. 4, a projector 40 of the present embodiment includes a wireless connecting apparatus 41, a projecting apparatus 42, a receiving apparatus 43 and a processing apparatus 44. The wireless connecting apparatus 41 is, for example, a wireless transmitter configured to establish the wireless connections with a plurality of user apparatuses. The projecting apparatus 42 is, for example, a high temperature polysilicon transmissive liquid crystal projecting apparatus or a digital light processing (DLP) projecting apparatus, capable of projecting an image provided by the user apparatus. The receiving apparatus 43 is, for example, a receiver for radio frequency or infrared transmission, capable of receiving a control signal transmitted by a radio frequency transmitter or an infrared transmitter. The processing apparatus 44 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing apparatus 44 is coupled to the wireless connecting apparatus 41, the projecting apparatus 42 and the receiving apparatus 43, and is capable of receiving the image provided by the user apparatus and controlling the projecting apparatus 42 to project the image, through the wireless connection established by the wireless connecting apparatus 41 according to the control signal received by the receiving apparatus 43.

Figure 5:
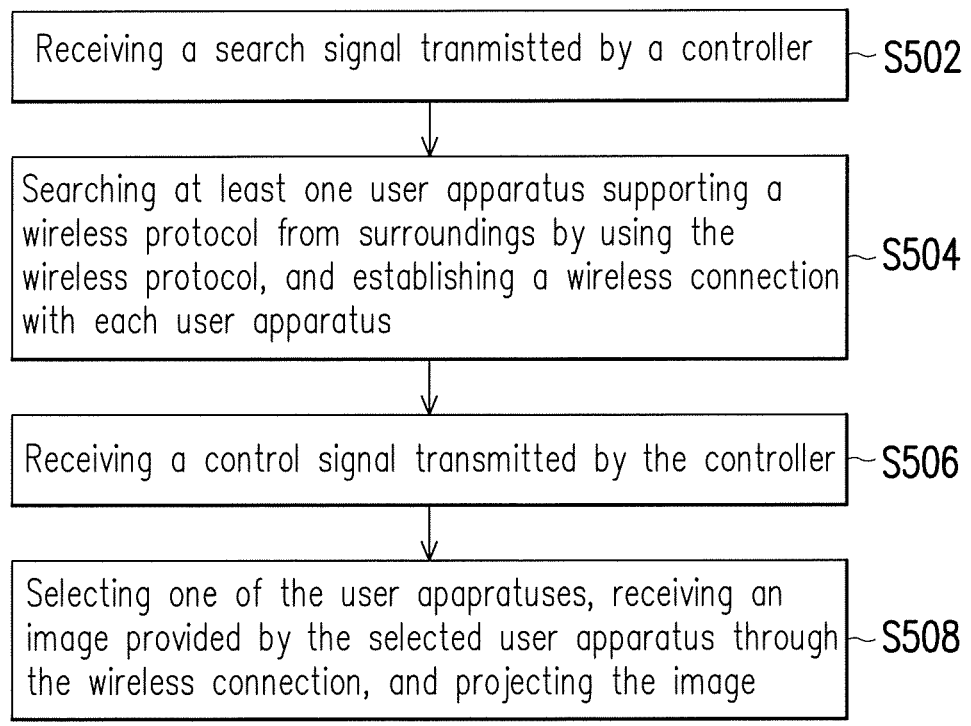
FIG. 5 is a flowchart illustrating a control method of a projector according to an embodiment of the invention.

FIG. 5 is a flowchart illustrating a control method of projector according to an embodiment of the invention. Referring to FIG. 5, the method of the present embodiment is suitable for the projector 40 depicted in FIG. 4. The following detailed steps are elaborated to describe the control method of projector of the invention with the reference to each element of the projector 40.

First, a search signal transmitted by a controller is received by the receiving apparatus 43 (step S502). Here, the wireless connecting apparatus 41 is controlled by the processing apparatus 44 to search at least one user apparatus supporting a wireless protocol from surroundings by using the wireless protocol, and establish a wireless connection with each user apparatus (step S504). The wireless protocol is, for example, a Wi-Fi Direct, but the invention is not limited thereto. During establishment of the wireless connection, for example, the processing unit 44 may establish a device list containing all of the user apparatuses according to a connecting sequence or a priority sequence of the user apparatuses having the wireless connection established, and the device list may serve as a reference for the user to switch or select the user apparatus.

Next, a control signal transmitted by the controller is received by the receiving apparatus 43 (step S506). The processing apparatus 44 selects one of the user apparatuses connected to the wireless connecting apparatus 41, receives the image provided by the selected user apparatus through the wireless connection, and controls the projecting apparatus 42 to project the image according to the control signal received (step S508). Therein, in an embodiment, the processing apparatus 44 may directly confirm the user apparatus currently using the Miracast technology according to the user apparatus corresponding to the control signal. In another embodiment, when the control signal is received by the receiving apparatus 43, the processing apparatus 44 first displays the device list previously established in the image projected by the projecting apparatus 42, so as to prompt the user about the user apparatuses currently available (connected). Next, one of the user apparatuses in the device list is selected according to a select signal received by the receiving apparatus 43 from the controller, so that the image provided by the selected user apparatus may be received through the wireless connection, and the projecting apparatus 42 is controlled to project the image.

Based on above method, in case multiple user apparatuses are connected at the same time, the user may quickly select the user apparatus to be used by operating the remote control, so that the selected user apparatus may control the projector 40 to project the image though the Miracast technology.

It should be noted that, in another embodiment of the invention, a plurality of control buttons may be disposed on the remote control for the user to perform operations such as connecting, interrupting, switching the user apparatus, to the projector. Another embodiment is given for illustration below.

Figure 6:
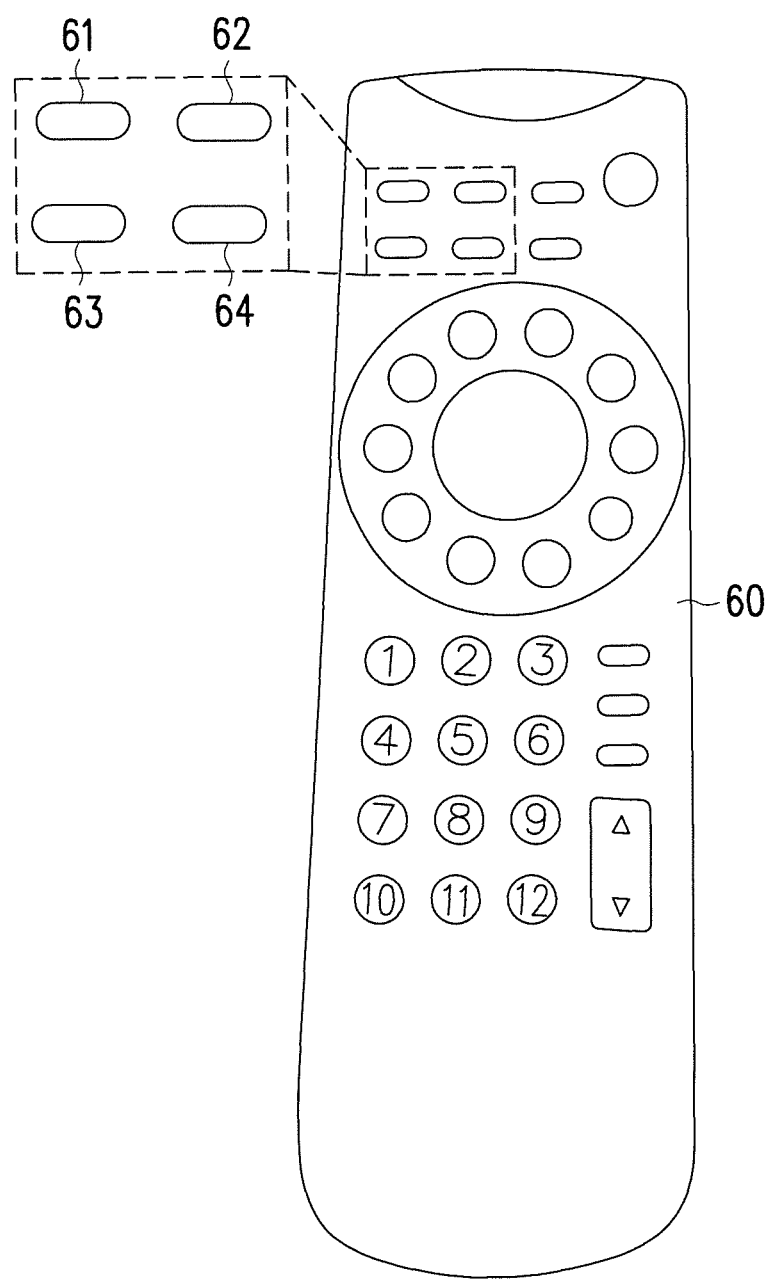
FIG. 6 is a schematic diagram illustrating a controller of the projector according to an embodiment of the invention.

FIG. 6 is a schematic diagram illustrating a controller of the projector according to an embodiment of the invention. Referring to FIG. 6, in the present embodiment, a search button 61, a connect button 62, an interrupt button 63 and a switch button 64 are disposed on a controller 60 of the projector, which are provided for the user to perform operations such searching, connecting, interrupting, switching the user apparatus, to the projector.

Figure 7:
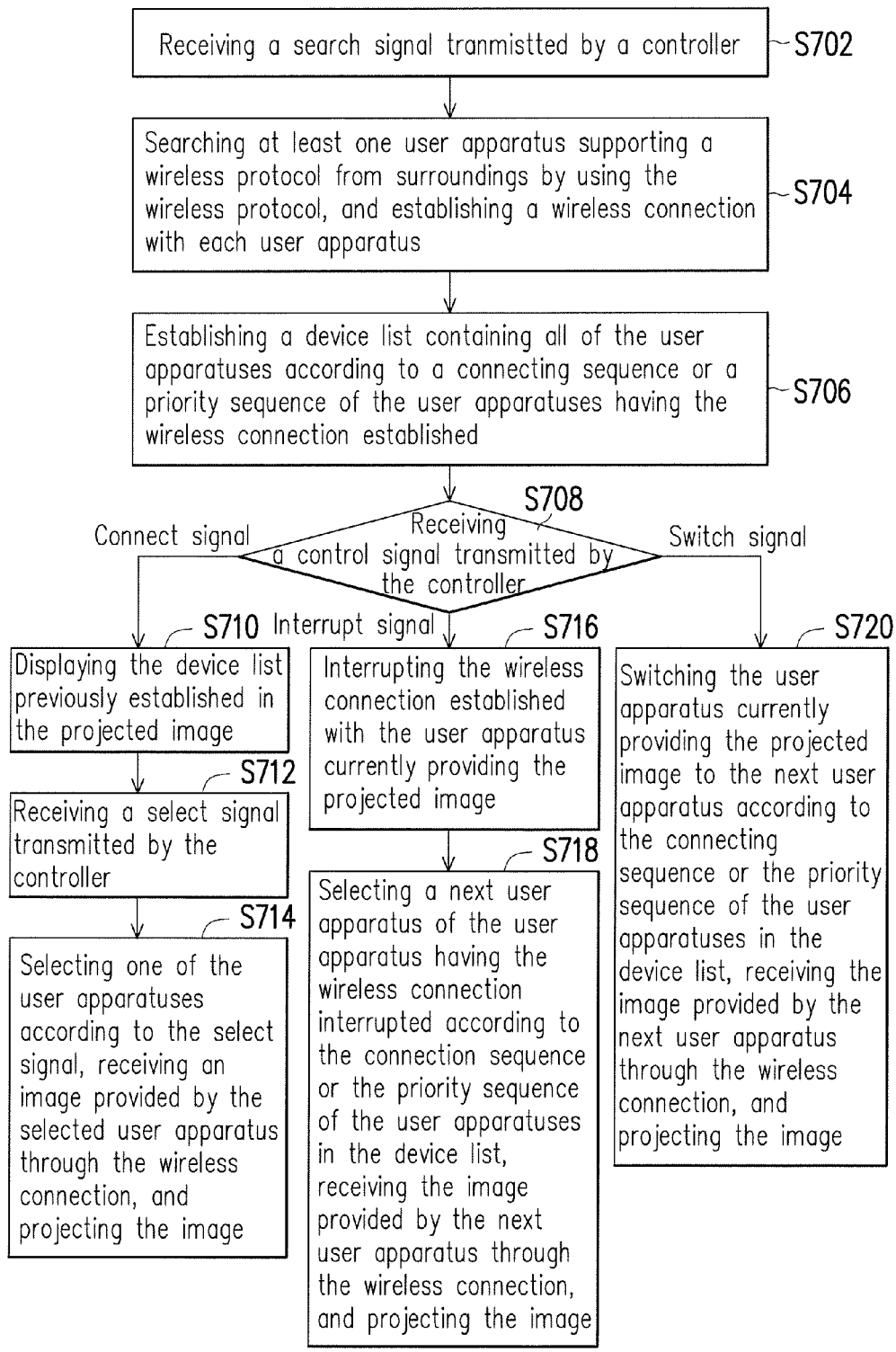
FIG. 7 is a flowchart illustrating a control method of projector according to an embodiment of the invention.

More specifically, FIG. 7 is a flowchart illustrating a control method of a projector according to an embodiment of the invention. Referring to FIG. 7, the method of the present embodiment is suitable for the projector 40 depicted in FIG. 4. The following detailed steps are elaborated to describe the control method of projector of the invention with the reference to each element of the projector 40.

First, a search signal transmitted by a controller is received by the receiving apparatus 43 (step S702). Here, the wireless connecting apparatus 41 is controlled by the processing apparatus 44 of the projector 40 to search at least one user apparatus supporting a wireless protocol from surroundings by using the wireless protocol, and establish a wireless connection with each user apparatus (step S704). Since steps S702 to S704 in the present embodiment are identical or similar to steps S202 to S204 in the foregoing embodiment, thus related description thereof is hereinafter.

Unlike the foregoing embodiment, in the present embodiment, after the wireless connections are established, the processing unit 44 establishes a device list containing all of the user apparatuses according to a connecting sequence or a priority sequence of the user apparatuses having the wireless connection established (step S706).

Accordingly, when the receiving apparatus 43 receives a control signal transmitted by the controller (step S708), the processing apparatus 44 may decide subsequent actions to be executed according to types of the control signal and the sequence recorded in the device list.

More specifically, in case the control signal received by the receiving apparatus 43 is a connect signal, the processing apparatus 44 displays the device list previously established in the image projected by the projecting apparatus 42 (step S710). Next, a select signal transmitted by the controller is received by the receiving apparatus 43 (step S712). Then, the processing apparatus 44 selects the corresponding user apparatuses in the device list according to the select signal, receives the image provided by the selected user apparatus through the wireless connection, and controls the projecting apparatus 42 to project the image (step S714).

In case the control signal received by the receiving apparatus 43 is an interrupt signal, the processing apparatus 44 interrupts the wireless connection of the wireless connecting apparatus 41 established with the user apparatus currently providing the image to be projected by the projecting apparatus 42 (step S716). Next, the processing apparatus 44 selects a next user apparatus of the user apparatus having the wireless connection interrupted according to the connection sequence or the priority sequence of the user apparatuses in the device list, receives the image provided by the next user apparatus through the wireless connection, and controls the projecting apparatus 42 to project the image (step S718). Since the next user apparatus has the wireless connection established in advance with the projector 40, when the user uses the controller to interrupt the Miracast connection of the original user apparatus, the projector 40 may instantly establish a Miracast connection with the next user apparatus, so that a next user may project the image through the Miracast technology. It should be noted that, in another embodiment, after the processing apparatus 44 interrupted the wireless connection of the current user apparatus, the next user apparatus is not necessary to be connected to vacate the access to the Miracast, and the processing apparatus may wait until a next control signal is transmitted by the user using the controller to select the next user apparatus for using the Miracast, and the invention is not limited thereto.

In case the control signal received by the receiving apparatus 43 is a switch signal, the processing apparatus 44 switches the user apparatus currently providing the image to be projected by the projecting apparatus 42 to the next user apparatus according to the connecting sequence or the priority sequence of the user apparatuses in the device list, receives the image provided by the next user apparatus through the wireless connection, and controls the projecting apparatus to project the image (step S720). Similarly, since the next user apparatus has the wireless connection established in advance with the projector 40, when the user uses the controller to switch the user apparatus, the projector 40 may instantly establish a Miracast connection with the next user apparatus, so that a next user may project the image through the Miracast technology.

Based on above method, in case multiple user apparatuses are connected at the same time, the user may operate the remote control to quickly perform the operations such as searching, connecting, interrupting, and switching.

It should be noted that, the projector is served as a main part for executing operations in the foregoing embodiment. In another embodiment, the main part for executing the control method of the invention may also be an image output apparatus connected to the projector. The image output apparatus may establish a wireless connection to each of the user apparatuses in advance, so that the user apparatuses may output images to the projector through the image output apparatus for the projecting the image by the projector.

Figure 8:
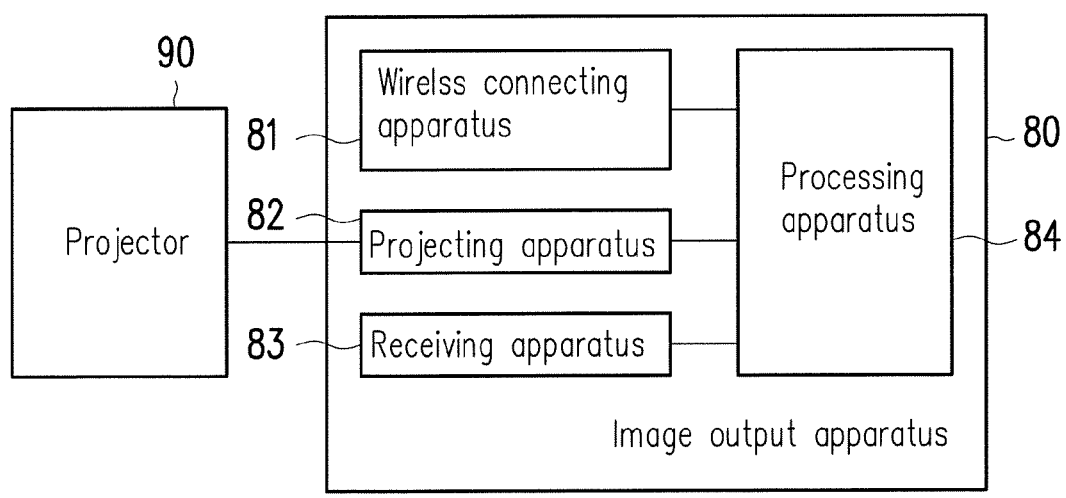
FIG. 8 is a block diagram illustrating an image output apparatus according to an embodiment of the invention.

For instance, FIG. 8 is a block diagram illustrating an image output apparatus according to an embodiment of the invention. Referring to FIG. 8, an image output apparatus 80 of the present embodiment includes a wireless connecting apparatus 81, an output apparatus 82, a receiving apparatus 83 and a processing apparatus 84. Therein, functions of the wireless connecting apparatus 81, the receiving apparatus 83 and the processing apparatus 84 are identical or similarly to those of the wireless connecting apparatus 41, the receiving apparatus 43 and the processing apparatus 44 in the foregoing embodiment, thus related description thereof is omitted hereinafter.

Unlike the foregoing embodiments, in the present embodiment, the image output apparatus 80 outputs, through the output apparatus 82, the image received by the wireless connecting apparatus 81 from the user apparatus to a projector 90, so that the image is projected by the projector 90. The output apparatus 82 is, for example, a High-Definition Multimedia Interface (HDMI), a Digital Visual Interface (DVI) or a D-sub interface, and the invention is not limited thereto. A difference between the present embodiment and the foregoing embodiments is only that, the control signal is received by the projector itself for connecting with the user apparatus and playing the images in the foregoing embodiment, while in the present embodiment, the control signal is received by a Dongle attached outside of the projector for connecting with the user apparatus and playing the images, and lastly, the image received from the user apparatus is outputted to the projector so as to be projected by the projector. Technical content regarding how to establish the connection with the user apparatus and how the user apparatus plays the images using the Miracast technology is identical to that in the foregoing embodiments, thus it is omitted hereinafter.

In addition, it should be noted that, in the foregoing embodiments, an independent controller is used to control the projector or the image output apparatus. However, in another exemplary embodiment, the controller may also one of the user apparatuses. In other words, the user may utilize the Wi-Fi Direct technology to establish the wireless connection with the projector, and the control signal may be transmitted to the projector through Wi-Fi Direct thereby controlling the projector to execute said controlling functions. Moreover, the device list established by the projector may also be transmitted back to the user apparatus through the wireless connection, and served as a reference for the user of the user apparatus to operate the user apparatus so as to quickly perform operations such as searching, interrupting, switching on the user apparatuses. Since detailed steps of the control method are identical or similar to those of the foregoing embodiments, thus related description thereof is omitted hereinafter.

Based on above, the projector, the image output apparatus and the control method thereof of the present invention may control the projector by using a remote control as a replacement of software, so that the user may apply the Miracast technology more easily, and the projector may be disconnected quicker and easier by utilizing the remote control to force disconnecting the Miracast. In addition, a connection may be established by the user using the Miracast technology by utilizing a higher priority of Wi-Fi Direct technology. When it comes to switch between the users, the connection may be established quickly through the remote control. As a result, the application of the Miracast technology may be easier and more effective by performing operations of scanning, selecting and switching on the user apparatuses.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A control method of a projector, adapted to a projector to receive a control signal and project an image, the method comprising:
   receiving a search signal transmitted by a controller, searching at least one user apparatus supporting a WiFi Direct technology from surroundings, and establishing a wireless connection with each of the at least one user apparatus by using the WiFi Direct technology; and
   receiving a control signal transmitted by the controller, selecting one of the at least one user apparatus according to the control signal, interrupting the wireless connection established with the user apparatus currently providing the projected image, receiving the image provided by the selected user apparatus through the wireless connection, and projecting the received image by using a Miracast technology.

2. The control method as recited in claim 1, wherein after the step of establishing the wireless connection with each of the at least one user apparatus by using the WiFi Direct technology, the control method further comprises:
   establishing a device list containing the user apparatuses having the wireless connection established according to a connection sequence or a priority sequence of the user apparatuses having the wireless connection established.

3. The control method as recited in claim 2, wherein after the step of establishing the device list containing the user apparatuses having the wireless connection established according to the connection sequence or the priority sequence of the user apparatuses having the wireless connection established, the control method further comprises:
   displaying the device list in the projected image when the control signal transmitted by the controller is received.

4. The control method as recited in claim 2, wherein the steps of receiving the control signal transmitted by the controller, selecting the one of the at least one user apparatus, interrupting the wireless connection established with the user apparatus currently providing the projected image, receiving the image provided by the selected user apparatus through the wireless connection, and projecting the image by using, a Miracast technology comprise:
   selecting one of the user apparatuses in the device list, interrupting the wireless connection established with the user apparatus currently providing the projected image, receiving the image provided by the selected user apparatus through the wireless connection according to the control signal, and projecting the image.

5. The control method as recited in claim 2, wherein after the step of interrupting the wireless connection established with the user apparatus currently providing the projected image, the control method further comprises:
   selecting a next user apparatus of the user apparatus having the wireless connection interrupted according to the connection sequence or the priority sequence of the user apparatuses in the device list, receiving the image provided by the next user apparatus through the wireless connection, and projecting the image.

6. The control method as recited in claim 2, wherein the steps of receiving the control signal transmitted by the controller, selecting one of the at least one user apparatus, interrupting the wireless connection established with the user apparatus currently providing the projected image, receiving the image provided by the selected user apparatus through the wireless connection, and projecting the image comprise:
   switching from the user apparatus currently providing the projected image to a next user apparatus according to the connection sequence or the priority sequence of the user apparatuses in the device list, receiving the image provided by the next user apparatus through the wireless connection, and projecting the image.

7. The control method as recited in claim 2, wherein after the step of establishing the device list containing the user apparatuses having the wireless connection established according to the connection sequence or the priority sequence of the user apparatuses having the wireless connection established, the control method further comprises:
   transmitting the device list to the controller, and displaying the device list on the controller.

8. The control method as recited in claim 1, wherein the controller is one of the at least one user apparatus, and the controller establishes the wireless connection with the projector by using the WiFi Direct technology and transmits the search signal and the control signal through the wireless connection.

9. A projector, comprising:
a wireless connecting apparatus, configured to search at least one user apparatus supporting a WiFi Direct technology from surroundings by using the WiFi Direct technology, and establish a wireless connection with each of the at least one user apparatus;
a projecting apparatus, configured to project an image provided by one of the at least one user apparatus;
a receiving apparatus, configured to receive a control signal transmitted by a controller; and
a processing apparatus, coupled to the wireless connecting apparatus, the projecting apparatus and the receiving apparatus, and configured to select one of the at least one user apparatus connected to the wireless connecting apparatus, interrupt the wireless connection established by the wireless connecting apparatus with the user apparatus currently providing the projected image, receive the image provided by the user apparatus through the wireless connection, and control the projecting apparatus to project the image by using a Miracast technology according to the control signal received by the receiving apparatus.

10. The projector of claim 9, wherein the processing apparatus further establishes a device list containing the user apparatuses having the wireless connection established according to a connecting sequence or a priority sequence of the user apparatuses having the wireless connection established.

11. The projector of claim 10, wherein the processing apparatus further displays the device list in the projected image when the control signal is received by the receiving apparatus.

12. The projector of claim 10, wherein the processing apparatus selects one of the user apparatuses in the device list, interrupts the wireless connection established with the user apparatus currently providing the projected image, receives the image provided by the selected user apparatus through the wireless connection, and controls the projecting apparatus to project the image according to the control signal received by receiving apparatus.

13. The projector of claim 10, wherein the processing apparatus switches the user apparatus currently providing the projected image to a next user apparatus according to the connecting sequence or the priority sequence of the user apparatuses in the device list, receives the image provided by the next user apparatus through the wireless connection, and controls the projecting apparatus to project the image.

14. The projector of claim 10, wherein the controller is one of the user apparatuses, and the controller establishes the wireless connection with the wireless connecting apparatus of the projector by using the WiFi Direct technology and transmits the control signal through the wireless connection.

15. The projector of claim 14, wherein the processing apparatus displays the device list on the controller by transmitting the device list to the controller through the wireless connection.

16. The projector of claim 9, wherein the processing apparatus further selects a next user apparatus of the user apparatus having the wireless connection interrupted according to the connecting sequence or the priority sequence of the user apparatuses in the device list, receives the image provided by the next user apparatus through the wireless connection, and controls the projecting apparatus to project the image.

17. An image output apparatus, comprising:
a wireless connecting apparatus, configured to search at least one user apparatus supporting a WiFi Direct technology from surroundings by using the WiFi Direct technology, and establish a wireless connection with each of the at least one user apparatus;
an output apparatus, connected to a projector and configured to output an image provided by one of the at least one user apparatus to the projector for projecting the image by the projector;
a receiving apparatus, configured to receive a control signal transmitted by a controller; and
a processing apparatus, coupled to the wireless connecting apparatus, the output apparatus and the receiving apparatus, and configured to select one of the at least one user apparatus connected to the wireless connecting apparatus, interrupt the wireless connection established by the wireless connecting apparatus with the user apparatus currently providing the projected image, receive the image provided by the selected user apparatus through the wireless connection, and output the image to the projector through the output apparatus for projecting the image by the projector by using a Miracast technology according to the control signal received by the receiving apparatus.

* * * * *